June 16, 1953  A. W. BEDFORD, JR., ET AL  2,642,160
TWO-SHOE INDUSTRIAL TYPE BRAKE Filed Oct. 1, 1948

Inventors:
Alexander W. Bedford Jr.
Ernest F. Goetz,
by Clarke H. Mott
Their Attorney.

Patented June 16, 1953

2,642,160

UNITED STATES PATENT OFFICE 2,642,160

TWO-SHOE INDUSTRIAL TYPE BRAKE

Alexander W. Bedford, Jr., and Ernest F. Goetz, Schenectady, N. Y., assignors to General Electric Company, a corporation of New York Application October 1, 1948, Serial No. 52,372

4 Claims. (Cl. 188—171)

Our invention relates to electromagnetic brakes, and more particularly to spring applied, electromagnetically released brakes commonly used in industrial applications.

It is a general object of our invention to provide a new and improved electromagnetic brake which is simple, reliable and durable in structure and easily accessible for servicing.

It is a further object of our invention to provide a new and improved brake shoe provided with a readily replaceable brake shoe lining.

It is a still further object of our invention to provide a new and improved adjustable brake shoe mounting particularly applicable to armature actuated electromagnetic brakes.

Figure 1:
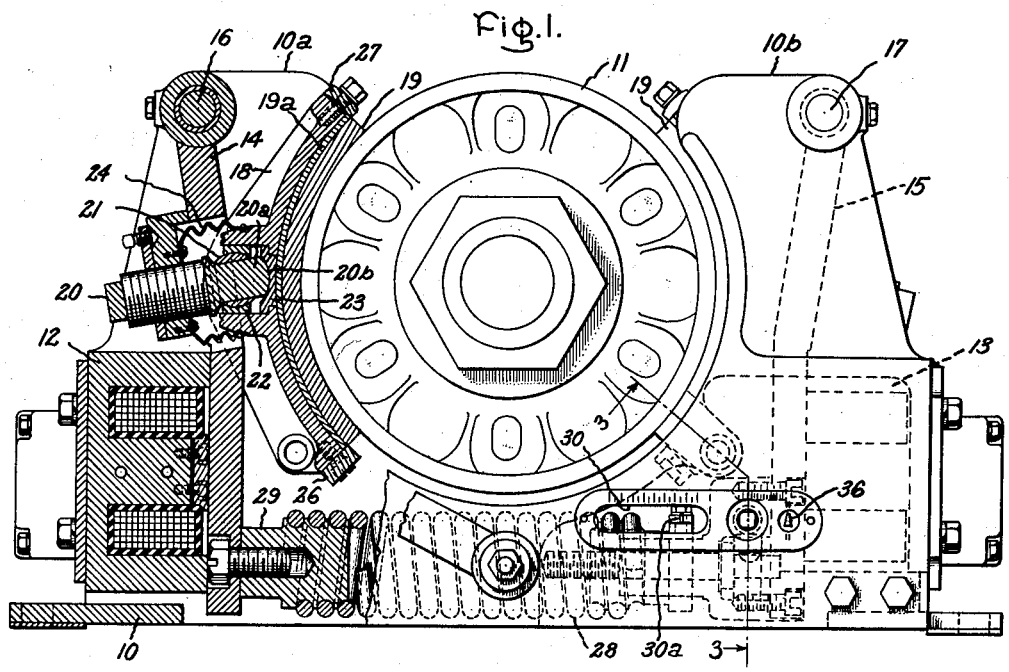
Figure 2:
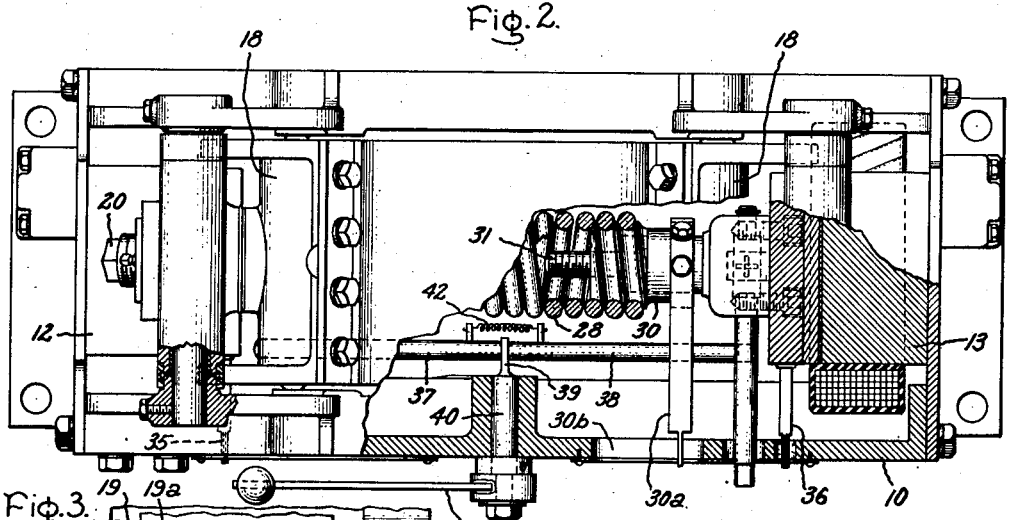
Figure 3:
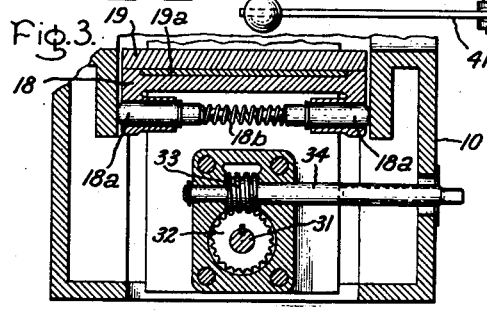

Our invention itself will be more fully understood and its various objects and advantages further appreciated by referring now to the following detailed specification taken in conjunction with the accompanying drawing, in which Fig. 1 is a side elevational view, partly in section, of an electromagnetic brake embodying our invention; Fig. 2 is a plan view, partly in section, of the electromagnetic brake shown at Fig. 1; and Fig. 3 is a detailed cross sectional view taken along the line 3—3 of Fig. 1 to illustrate the brake shoe structure and the spring tension control mechanism for the brake.

Referring now to the drawing, the brake, there shown by way of illustration, comprises a base 10 having a pair of spaced apart upright side portions 10a and 10b providing therebetween an opening for a rotatable brake drum 11. Mounted in the base 10 at opposite ends thereof and below the center line of the brake drum 11, are a pair of electromagnets 12 and 13. The electromagnets 12 and 13 are provided respectively with movable armatures 14 and 15 which are pivoted at 16 and 17, respectively, on opposite sides of the base at points above the center line of the brake drum 11. The armatures 14 and 15 extend downwardly in substantially parallel spaced relation on opposite sides of the brake drum 11. On each armature, intermediate its ends, there is mounted an arcuate brake shoe including a casting or base member 18 and a removable brake liner 19. The brake shoes and their mountings are identical in structure, so that only a single shoe will be described in detail.

Referring by way of example to the armature 14, the brake shoe base 18 mounted thereon is loosely mounted by means of a ball and socket joint formed at the projecting end of a pin 20 which is adjustably mounted in the armature 14 intermediate its ends. The pin 20 is transversely disposed in the armature and arranged for rectilinear adjusting movement to compensate for wear on the brake shoe liner 19. In the illustrated embodiment of the invention, the pin 20 is threaded into the armature and provided with an unthreaded projecting end 20a of reduced cross section. The projecting end surface 20b of the pin 20 is of spherical configuration. The pin 20 has fixedly mounted on the end 20a thereof, a collar 21, the external configuration of which is spherical and concentric with the spherical surface 20b at the end of the pin. The collar 21 and the end 20a of the pin constitute a spherical bearing member upon which the brake shoe 18 is mounted. For this purpose, the brake shoe casting 18 is provided intermediate its ends with a spherical socket formed in a recess in the casting and comprising a sleeve 22 having a spherical inner surface and a socket member 23 having a spherical inner surface concentric with the spherical surface of the sleeve 22. In assembled position, the spherical collar 21 fits into the spherical sleeve 22, and the spherical end surface 20b of the pin 20 bears against the spherical seat in the socket member 23. The socket member 23 and the end surface 20b of the pin 20 constitute a thrust bearing through which pressure is applied to force the brake shoe against the brake drum 11. In order to keep the ball and socket joint between the armature and the brake shoe free of dust, dirt, oil, and the like, a flexible bellows 24 is connected at one end to the armature and at the other end to the brake shoe thereby to cover the ball and socket joint at the end of the pin 20.

It will be evident from the foregoing description of the brake shoe mounting that this mounting may be advanced or retracted in each armature to advance or retract the associated brake shoe toward or away from the drum 11. The shoe castings 18 may thus be readjusted in position as the liners 19 wear to maintain within desired limits the air gaps between the magnets 12 and 13 and their respective armatures 14 and 15. Moreover, the spherical shoe mounting joints permit an appreciable tolerance in positioning of the brake 10 with respect to the drum 11. For example, the brake axis transverse of the drum 11 need not be exactly perpendicular to the drum shaft, and a certain degree of angular misalignment of the brake 10 about this transverse axis is permissible.

As shown at Fig. 3, each brake shoe is movable within a passageway in the base 10, and is provided at its lower end with a pair of springpressed friction pins 18a to ensure proper retractive movement of the shoe. The pins 18a are loosely and slidably mounted in opposite sides of each brake shoe and are biased apart by a compression spring 18b to engage opposite walls of the passageway in the base 10. Thus, upon retraction, each brake shoe first moves away from the drum along its entire surface within the limit of tolerance provided by the loose mounting of the pins 18a, and thereafter the lower end of each shoe drags on the pins 18a to ensure proper freeing of the top ends of the shoes.

Each brake shoe casting 18 carries a removable brake liner 19 fixed to a rigid backing plate 19a. The backing plate 19a is preferably metal, and is fixedly attached, as by cementing, to the lining material 19 itself. As shown at Fig. 3, the backing plate 19a is preferably slightly narrower than the lining material 19. The inner arcuate surface, or liner mounting surface, of the brake shoe casting 18 is provided for its entire length with a wide groove into which the liner backing 19a fits to prevent lateral displacement of the lining. To prevent arcuate displacement of the brake liner 19, 19a, the liner is held between a pair of clamping plates 26 and 27 bolted to the brake shoe casting 18 at opposite arcuately displaced ends of the shoe. Thus, to insert a liner, the top clamping plate 27 is removed and the liner 19, 19a, is slipped out of the brake shoe casting 18 by arcuate movement around the brake drum 11. A new liner is then slid in place around the drum with the liner backing 19a disposed in the groove in the brake shoe casting. The liner is slid into the shoe base 18 until it engages the clamp 26 as a stop, and the clamp 27 is then replaced. This replacement operation is permitted by the fact that the top of the brake drum is open and freely accessible.

Between the lower ends of the armatures 14 and 15, and beneath the brake drum 11, there is disposed a tension spring 28 which draws the ends of the armatures toward each other and thus applies the brake by forcing the brake shoes into engagement with the drum 11.

The spring 28 is connected at one end to a helically grooved spring seat 29 which is bolted to the lower end of the armature 14. The opposite end of the spring 28 is fastened to a helically grooved traveling nut 30 which is mounted on a rotatable threaded shaft 31. The threaded shaft 31 is rotatably mounted upon the lower end of the armature 15, and provides for adjustment of the tension exerted by the spring 28 upon the armatures 14 and 15. As shown at Fig. 3, the shaft 31 carries a spur gear 32 which meshes with a worm 33 fixed to a transverse shaft 34. The end of the shaft 34 projects through an aperture in the side of the casing 10 to facilitate spring adjustment. Adjustment of the spring tension is accomplished by turning the shaft 34 and thus rotating the shaft 31, thereby to move the traveling nut 30 along the shaft 31.

The traveling nut 30 is provided with a laterally extending pointer 30a, the end of which extends through an elongated aperture 30b in the side of the base 10 to indicate the magnitude of the spring tension, or equivalent brake torque.

The lower ends of the armatures 14 and 15 are provided, respectively, with laterally extending pointers 35 and 36, the ends of which project through apertures in the side of the base 10 to indicate the magnitude of the gap between each armature and its cooperating magnet pole face. It will be understood that if because of wear on a brake shoe lining, the armature gap becomes larger than desirable, adjustment may be made at the adjustable brake shoe mounting pin 20 to return the armature gap to the desired length with the brake shoe engaging the drum.

Means are provided for manually releasing the brake by mechanically forcing apart the armatures 14 and 15. This mechanical release comprises a pair of oppositely extending rods 37 and 38, the proximate ends of which engage a cam 39 and the remote ends of which are arranged to engage the armatures 14 and 15, respectively. The cam 39 is connected by a rotatable shaft 40 to an operating arm 41 on the outside of the base 10. The rods 37 and 38 are held against opposite sides of the cam 39 by a tension spring 42 connected between the rods.

It will now be observed that, in operation, the spring 28 normally draws the armatures 14 and 15 toward each other and thus applies the brake by pressing the brake shoes 18, 19 against the drum 11. The pressure exerted by the brake shoes is dependent upon the tension of the spring 28 and this, in turn, is controlled by the position of the traveling nut 30. In this applied position of the brakes, the air gaps between the armatures 14 and 15 and their associated magnet pole faces are independently controlled by the adjustable brake shoe mounting pins 20. These gaps should be set between the desired maximum and minimum values, and should be reset as the brake linings wear to compensate for such wear. The magnitude of the air gaps is indicated by the pointers 35 and 36. When it is desired to release the brakes, the electromagnets 12 and 13 are energized to attract their respective armatures 14 and 15, thereby to draw the brake shoes away from the brake drum 11. Manual release of the brake is accomplished by turning the handle 41 in either direction, thereby mechanically to force the armatures 14 and 15 into engagement with the magnet pole faces by means of the rods 37 and 38.

It will be further observed that, because of the arrangement of the energizing magnets 12 and 13 on opposite sides of the brake drum below the center line of the drum, and the position of the biasing spring 28 between the armatures beneath the drum, the brake shoes 18, 19 and the brake drum 11 are readily accessible from the top and ends of the drum. This arrangement of the operating parts, in combination with our new and novel end clamping arrangement for the brake shoe linings, permits quick and easy replacement of the brake linings by simply sliding new linings arcuately around the drum from the open top of the drum into position in the brake shoes. Because of this provision, it is unnecessary to remove the brake shoe castings 18 bodily from the base 10 in order to replace the linings. Readjustment of each brake shoe upon replacement of a lining is easily and quickly accomplished simply by adjusting the associated brake shoe mounting pin 20, the end of which is readily accessible at the exposed rear of the armature. Our open-top construction also permits ready removal of the brake drum 11 by upward movement, without prior removal of the brake shoes 18, 19.

While we have described by way of illustration a preferred embodiment of our invention, many modifications will occur to those skilled in the art and we, therefore, wish to have it understood that we intend in the appended claims to cover all such claims and modifications as fall within the true spirit and scope of our invention.

What we claim as new and desire to secure by Letters Patent of the United States is:

1. An electromagnetic brake comprising a brake drum, a movable armature pivotally mounted for movement toward and away from said drum, a transverse pin adjustably mounted in said armature, said pin having a projecting end provided with a spherical end surface, a collar fixedly mounted on said projecting end and providing a spherical outer surface concentric with said spherical end surface, an arcuate brake shoe provided intermediate its ends with a spherical bearing socket mounted upon said collar, said socket including a spherical portion bearing directly against said spherical end of said pin, means for biasing said armature to bring said shoe into engagement with said drum, and an electromagnet for moving said armature to a predetermined fixed position of retraction to release said brake.

2. An electromagnetic brake comprising a brake drum, a movable armature pivotally mounted for movement toward and away from said drum, electromagnetic means for attracting said armature to a predetermined fixed retracted position, a bearing pin provided with a projecting end and adjustably mounted in said armature for rectilinear movement transverse of said armature, and an arcuate brake shoe having intermediate its ends a ball and socket connection with the projecting end of said pin.

3. An electromagnetic brake comprising a brake drum, a movable armature pivotally mounted for movement toward and away from said drum, a bearing pin adjustably mounted in said armature for rectilinear movement transverse of said armature, said pin having a projecting end providing a spherical bearing member, said bearing member including a spherical end surface of said pin, an arcuate brake shoe provided intermediate its ends with a spherical socket in which said bearing member is positioned, said end surface of said pin bearing directly against a portion of said socket, means for biasing said armature to bring said shoe into engagement with said drum, and an electromagnet for moving said armature to a predetermined fixed position of retraction to release said brake.

4. An electromagnetic brake comprising a rotatable brake drum having a horizontal shaft, a base member provided with a pair of stationary upright supporting members on opposite sides of said drum extending from the general horizontal plane of said base a distance substantially equal to the distance between said plane and the point on the periphery of said drum most remote from said plane, a pair of magnetizable armatures disposed on opposite sides of said drum, pivotal connections between said armatures and said upright members at the free ends of said upright members most remote from said general plane of said base member, said armatures extending toward said base in substantially parallel spaced relationship, a pair of arcuate brake shoes, each pivotally mounted on a corresponding one of said armatures intermediate its ends in position to engage said drum, spring means disposed between said drum and said general horizontal plane of said base and attached to said armatures for biasing said armatures to press said shoes into engagement with said drum, and a pair of electromagnets disposed on the side of the center line of said drum nearest said general plane of said base and each mounted on said base in attractive relation to a corresponding one of said armatures to attract said armatures to brake releasing position.

ALEXANDER W. BEDFORD, Jr.
ERNEST F. GOETZ.

References Cited in the file of this patent

UNITED STATES PATENTS

| Number | Name | Date |
|---|---|---|
| 766,117 | Rundle | July 26, 1904 |
| 870,711 | Blair et al. | Nov. 12, 1907 |
| 1,407,207 | McAuly | Feb. 21, 1922 |
| 1,606,745 | Bouton | Nov. 16, 1926 |
| 1,856,812 | Jirka | May 3, 1932 |
| 1,860,394 | Ohler | May 31, 1932 |
| 2,155,221 | Farmer | Apr. 18, 1939 |
| 2,254,887 | Cox | Sept. 2, 1941 |
| 2,314,451 | Lillquist | Mar. 23, 1943 |